United States Patent Office 2,721,212
Patented Oct. 18, 1955

2,721,212

PROCESS FOR PREPARING ACYLAMIDES

Martin L. Black, Birmingham, Mich., assignor to Parke, Davis & Company, Detroit, Mich., a corporation of Michigan No Drawing. Application October 24, 1952,
Serial No. 316,769

10 Claims. (Cl. 260—562)

This invention relates to a process for the preparation of acylamido diol compounds. More particularly, this invention relates to a process for the production of 1-phenyl-2-dichloro-acetamido-1,3-diol compounds having the formula,

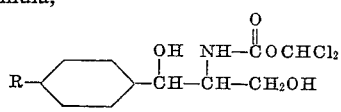

wherein R represents a methylmercapto, methylsulfinyl, or methylsulfonyl substituent.

The above compounds, as well as the starting materials used in their preparation, can exist in structural or diastereoisomeric, as well as optical isomeric forms. The diastereoisomeric forms are herein referred to as the threo (pseudo) and the erythro (regular) forms, respectively. Each of these diastereoisomers can exist as racemates of optically active isomers, thus giving a total of six different forms. Because of the difficulty of representing these different forms in graphic formulae, the customary structural formulae will be used in the specification and the claims and a notation placed below or to the side of the formula to designate the particular structural and optical configuration of the compound. When the formula represents the unresolved mixture of structural and optical isomers, the notation "unresolved" will be used. However, it should be expressly understood that where no notation appears with a structural formula, the formula is to be interpreted in its generic sense, that is, as representing the D-threo, L-threo, D-erythro or L-erythro isomers in separated form, as well as DL-threo or DL-erythro optical racemates or the total unresolved mixture of structural and optical isomers. Such a formula does not merely represent the unresolved mixture of isomers.

In accordance with the invention, 1-phenyl-2-dichloro-acetamidopropane-1,3-diol compounds having the above formula are produced by reacting pentachloroacetone which has the formula,

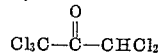

with an amino diol compound of the formula,

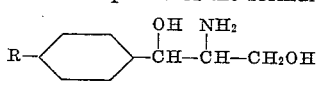

wherein R is a methylmercapto, methylsulfinyl or methylsulfonyl group. The process may be diagrammatically represented as follows;

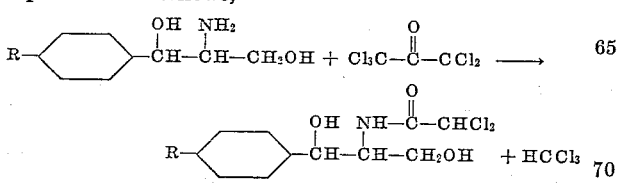

wherein R has the same significance as given above.

In carrying out the process of the invention, a wide range of temperatures can be used; for example, 0° to 80° C. However, since the reaction often proceeds slowly at the lower temperatures, it is preferable to carry out the reaction at temperatures of 30° to 60°. The use of intermediate temperatures also avoids the possibility of side reactions at the higher temperatures. The time required for reaction is, of course, dependent on the temperature, but, as a practical matter, the time allowed for reaction is not critical. In general, the reaction is complete within one-half hour to six hours when a temperature of 25 to 80° C. is used.

As a solvent for the reaction, it is preferable to use an anhydrous organic solvent such as a lower aliphatic alcohol, lower aliphatic ketone, lower aliphatic ester, lower aliphatic ether, lower aliphatic amide, cyclic ether, or a mixture of two or more such solvents. Some specific examples of these solvents are methanol, ethanol, isopropanol, acetone, methyl ethyl ketone, ethyl acetate, dimethyl formamide, dimethyl acetamide and dioxane. The relative quantities of the two reactants are not particularly critical, but for reasons of economy and highest yields it is best to use a slight excess of pentachloroacetone.

The products produced by the process of the invention are useful as chemotherapeutic agents per se or as intermediates for the production of other organic compounds possessing valuable therapeutic properties.

The invention is illustrated by the following examples.

Example 1

A solution of 2.5 g. of pentachloroacetone and 2.1 g. of D - (—) - threo-1-p-methylmercaptophenyl-2-aminopropane-1, 3-diol ($[\alpha]_D^{25} = -23°$ (alcohol)) in 100 ml. of absolute ethanol is shaken at room temperature for 6 hours and the solvent removed by distillation in vacuo. Recrystallization of the residue from aqueous methanol, with charcoal treatment gives pure D-(+)-threo-1-p-methylmercaptophenyl - 2 - dichloroacetamidopropane-1,3-diol, M. P. 110–2° C.; $(\alpha)_D^{27} = +9.8°$ in ethanol. formula of this compound is,

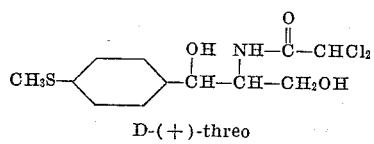

D-(+)-threo

Example 2

A solution of 2.5 g. of pentachloroacetone and 2.1 g. of DL - threo - 1 - p - methylmercaptophenyl - 2 - aminopropane-1,3-diol in 200 ml. of dry acetone is refluxed for 15 minutes, and the solvent removed by vacuum distillation. Recrystallization of the residue from aqueous acetone gives pure DL-threo-1-p-methylmercaptophenyl-2-dichloroacetamidopropane-1,3-diol; M. P. 101° C. The formula of this compound is,

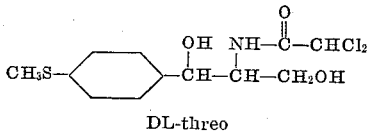

DL-threo

Example 3

A solution of 2.5 g. of pentachloroacetone and 2.4 g. of DL-threo-1-p-methylsulfinylphenyl-2 - aminopropane-1,3-diol in 250 ml. of dioxane is allowed to stand at room temperature for 4 hours with occasional shaking. The solvent is removed by vacuum distillation and the residue recrystallized from aqueous dioxane to obtain the desired DL-threo-1-p-methylsulfinylphenyl-2 - dichloroacetamidopropane-1,3-diol. The formula of this compound is:

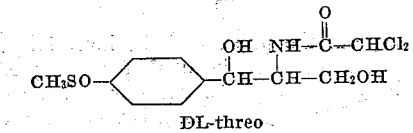

DL-threo

Example 4

A solution of 7.1 g. of pentachloroacetone and 7.4 g. of DL-threo-1-p-methylsulfonylphenyl-2- aminopropane-1,3-diol in 250 ml. of ethyl acetate is refluxed for 30 minutes and the solution diluted with 25 ml. of warm ligroin. On cooling the desired DL-threo-1-p-methylsulfonylphenyl-2-dichloro-acetamidopropane-1,3-diol separates from the solution; M. P. 180–82° C. The formula of this compound is,

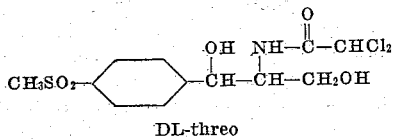

DL-threo

Example 5

A solution of 5.2 g. of pentachloroacetone and 5.4 g. of D-(−)-threo-1-p-methylsulfonylphenyl - 2 - aminopropane-1,3-diol in 300 ml. of acetone is refluxed for 1 hour. The solution is evaporated to dryness in vacuo and the residue purified by recrystallization from water to obtain the desired D-(+)-threo-1-p-methylsulfonylphenyl-2-dichloroacetamidopropane-1,3-diol, M. P. 165–6° C.; $(\alpha)_D^{25} = +15.6°$ in ethanol. The formula of this compound is,

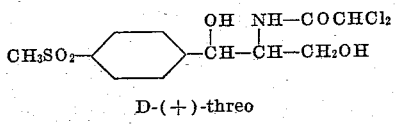

D-(+)-threo

Example 6

A solution of 5.2 g. of pentachloroacetone and 5.4 g. of L-(+)-threo-1-p-methylsulfonylphenyl- 2 - aminopropane-1,3-diol in 300 ml. of ethyl acetate is allowed to stand overnight in the refrigerator. The solution is evaporated to dryness at room temperature and the residue recrystallized from a mixture of ethyl acetate and ligroin to obtain the desired L-(−)-threo-1-p-methylsulfonylphenyl-2-dichloroacetamidopropane-1,3-diol, M. P. 165–6° C. The formula of this compound is;

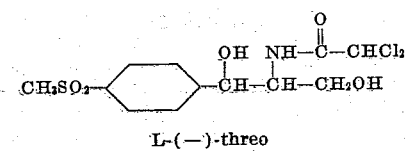

L-(−)-threo

Example 7

A solution of 3.1 g. of DL-erythro-1-p-methylsulfonylphenyl-2-aminopropane-1,3-diol and 2.9 g. of pentachloroacetone in 350 ml. of ethyl acetate was refluxed for 15 minutes. The solution was reduced to a volume of about 75 ml. by distillation. Addition of 20 ml. of warm ligroin to the solution and cooling caused separation of crystals of pure DL-erythro-1-p-methylsulfonylphenyl-2-dichloroacetamidopropane-1,3-diol. The formula of this compound is,

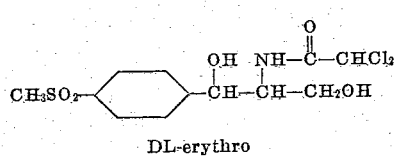

DL-erythro

What I claim is:

1. Process for the production of a 1-phenyl-2-dichloroacetamidopropane-1,3-diol compound of formula,

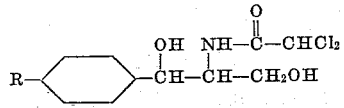

which comprises reacting an amino diol compound of formula,

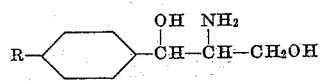

with pentachloroacetone at a temperature between 0° and 80°, where R is a substituent of the class consisting of methylmercapto, methylsulfinyl and methylsulfonyl radicals.

2. Process for the production of a 1-phenyl-2-dichloroacetamidopropane-1,3-diol compound of formula,

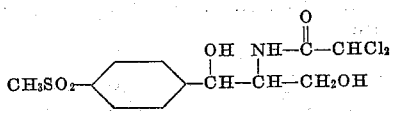

which comprises reacting an amino diol compound of formula,

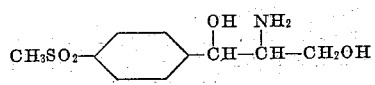

with pentachloroacetone in approximately equivalent amount in an anhydrous organic solvent at a temperature between 25° and 80° C.

3. Process for the production of DL-threo-1-p-methylsulfonylphenyl - 2 - dichloroacetamidopropane - 1,3 - diol which comprises reacting DL-threo-1-p-methylsulfonylphenyl-2-aminopropane-1,3-diol with pentachloroacetone in an organic solvent at a temperature between 25 and 80° C.

4. Process for the production of D-(+)-threo-1-p-methylsulfonylphenyl - 2 - dichloroacetamidopropane - 1,3-diol which comprises reacting D-(−)-threo-1-p-methylsulfonylphenyl-2-aminopropane-1,3-diol with pentachloroacetone in an anhydrous organic solvent at a temperature between 25 and 80° C.

5. Process for the production of a 1-phenyl-2-dichloroacetamidopropane-1,3-diol compound of formula,

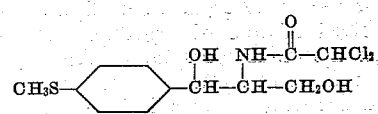

which comprises reacting an amino diol compound of formula,

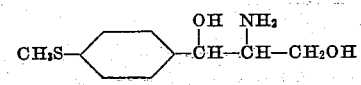

with pentachloroacetone in approximately equivalent amount in an anhydrous organic solvent at a temperature between 25 and 80° C.

6. Process for the production of DL-threo-1-p-methylmercaptophenyl - 2 - dichloroacetamidopropane - 1,3 - diol which comprises reacting DL-threo-1-p-methylmercaptophenyl-2-aminopropane-1,3-diol with pentachloroacetone in an anhydrous organic solvent at a temperature between 25 and 80° C.

7. Process for the production of D-(+)-threo-1-p-methylmercaptophenyl - 2 - dichloroacetamidopropane - 1,3-diol which comprises reacting D-(−)-threo-1-p-methylmercaptophenyl-2-aminopropane-1,3-diol with pentachloroacetone in an anhydrous organic solvent at a temperature between 25 and 80° C.

8. Process for the production of a 1-phenyl-2-dichloroacetamidopropane-1,3-diol compound of formula,

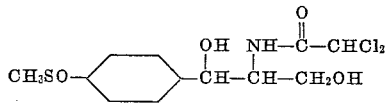

which comprises reacting an amino diol compound of formula,

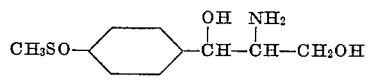

with pentachloroacetone in approximately equivalent amount in an anhydrous organic solvent at a temperature between 25 and 80° C.

9. Process for the production of DL-threo-1-p-methylsulfinylphenyl - 2 - dichloroacetamidopropane - 1,3 - diol which comprises reacting DL-threo-1-p-methylsulfinylphenyl-2-aminopropane-1,3-diol with pentachloroacetone in an anhydrous organic solvent at a temperature between 25 and 80° C.

10. Process according to claim 1 in which the reaction is carried out in an anhydrous organic solvent at a temperature between 30° and 60° C. with an approximately equivalent amount of pentachloroacetone.

References Cited in the file of this patent

UNITED STATES PATENTS 2,483,884    Crooks et al. _____ Oct. 4, 1949

OTHER REFERENCES

Cloez, "Annales de Chim. et Physique," vol. 9, series 6 (1886), pp. 191 and 192.

Fritsch, "Liebigs Annalen," vol. 279 (1894), page 318.